UNITED STATES PATENT OFFICE.

JABEZ JENKINS, OF PHILADELPHIA, PENNSYLVANIA.

COMPOSITION FOR LINING SAFES.

Specification forming part of Letters Patent No. 28,756, dated June 19, 1860.

*To all whom it may concern:*

Be it known that I, JABEZ JENKINS, of Philadelphia, in the county of Philadelphia and State of Pennsylvania, have invented a new and Improved Composition for the Lining of Fire-Proof Safes; and I do hereby declare that the following is a full, clear, and exact description of the same.

My invention consists in the employment of a composition of copperas or sulphate of iron mixed with plaster-of-paris or some other suitable material for the purpose of lining fire-proof safes.

The proportions in which I use the above-named ingredients are about as follows: copperas from thirty-three to fifty per cent.; plaster-of-paris or other suitable material from fifty to sixty-six per cent.

The copperas used for this composition ought to be of the kind called "rusty," and the quantity of copperas used in proportion to the other ingredient depends upon the quality of the copperas itself and upon the width of the fire-proof space to be filled. The copperas is roughly mixed as it comes with the proper quantity of ground plaster-of-paris, and the whole is then passed through any mill that will grind the copperas to about the fineness of coarse cornmeal. From the mill the two ingredients come out intimately mingled, and the plaster prevents the particles of copperas from adhering together again, which would be very likely to take place by the influence of a very small quantity of water of crystallization set free by the grinding. When freshly ground the mixture contains a very little dampness, just sufficient to promote its tight packing in the fire-proof space. This moisture, however, is reabsorbed by the copperas in a very short time, and for this reason I find it to advantage to use the mixture immediately after it has been ground. When the proportion of copperas in the composition exceeds the proper limit, on the fire-proof being exposed to fire the copperas stews out instead of calcining slowly, and the fire-proof quality is thereby injured. The water in this composition being held in a state of crystallization, a safe lined with it is perfectly dry, so that papers, deeds, &c., kept in one of my safes will not become moldy, and instruments or jewelry will not tarnish. The tenacity of copperas for its water of crystallization is much greater than that of alum or other salts generally employed for lining fire-proof safes, and for this reason one of my safes will stand a much greater heat than a safe lined with ordinary composition. Furthermore, the dryness of my composition renders the same perfectly harmless for the iron plates constituting the sides of the safe, whereas a composition which contains free moisture, such as those generally employed for the lining of safes, corrodes the iron plates very badly.

Instead of plaster-of-paris I have used slaked lime or dry clay, and I have also tried flour and sawdust with good results.

What I claim as new, and desire to secure by Letters Patent, is—

The employment of copperas or sulp of iron mixed with plaster-of-paris or some other suitable material, in the manner above described, for the purpose set forth.

JABEZ JENKINS.

Witnesses:
 CHARLES WILLIAMS,
 J. PLANKINTON.